United States Patent [19]
Park

[11] Patent Number: 5,138,464
[45] Date of Patent: Aug. 11, 1992

[54] INSTANT PROGRAM RECORDING SYSTEM OF VCR

[75] Inventor: Seung C. Park, Kangwon, Rep. of Korea

[73] Assignee: Goldstar Co. Ltd., Seoul, Rep. of Korea

[21] Appl. No.: 413,216

[22] Filed: Sep. 27, 1989

[30] Foreign Application Priority Data
Sep. 29, 1988 [KR] Rep. of Korea ............... 12617/1988

[51] Int. Cl.⁵ ............................................ H04M 11/00
[52] U.S. Cl. .................................. 358/335; 360/33.1; 379/104
[58] Field of Search ................. 358/335; 360/33.1; 455/4.5; 379/104, 77

[56] References Cited

U.S. PATENT DOCUMENTS

| | | | |
|---|---|---|---|
| 4,325,081 | 4/1982 | Abe et al. | 360/33.1 |
| 4,540,851 | 9/1985 | Hashimoto | 358/335 |
| 4,625,080 | 11/1986 | Scott | 358/335 |
| 4,841,562 | 6/1989 | Lem | 379/104 |
| 4,899,370 | 2/1990 | Kameo et al. | 358/335 |

Primary Examiner—Roy N. Envall, Jr.
Assistant Examiner—Khoi Truong

[57] ABSTRACT

A program recording system for VCR utilizing telephone ringing sound can be programmed by selecting specific channel in response to the ringing of a telephone when calling from another calling station. The recording system uses a microphone, an amplifying circuit, a tuning amplifier, a clamp, a switch, a data generator, a microcomputer, and a controller. The program recording function can be carried out by calling from another calling station at any time when it is required.

7 Claims, 2 Drawing Sheets

INSTANT PROGRAM RECORDING SYSTEM OF VCR

BACKGROUND OF THE PRESENT INVENTION

The present invention relates to a program recording system of a video tape cassette recorder (hereinafter, referred to as a VCR), and more particularly, to an instant program recording system for a VCR utilizing telephone ringing sound which can be programed by selecting a specific channel in response to the telephone ringing sound when calling from outside.

Generally, the program recording function has been carried out by previously setting the program recording time by a timer in the VCR. Therefore, when one has gone out without previously setting the program recording time, there is a disadvantage in that the program recording function cannot be carried out.

SUMMARY OF THE PRESENT INVENTION

Therefore, it is an object of the present invention to provide an instant program recording system of VCR capable of carrying out an instant program recording function, when calling from outside, accordingly a specific channel is selected in response to the ringing sound of the telephone.

The object of the present invention is accomplished by a microphone which receives the ringing sound of telephone, an amplifying circuit which amplifies the output signal of the microphone, an amplifier device for further amplifying the output signal of the amplifying circuit by tuning the present invention to the frequency of ringing sound (bell sound) of telephone, a clamping device for clamping the output signal of the tuning amplifier device into negative (−) voltage, a switching device which becomes ON/OFF in response to the output signal condition of the clamping device, a data generating device for outputting the power control signal of VCR by counting the ON/OFF times of the switching means and outputting the selecting data of a specific channel, a microcomputer for outputting the program record starting time in response to the selecting data of a specific channel of the data generating device and carrying out the program recording function by selecting a specific channel, and a control device for stopping the operation of the microphone in response to the program record starting signal of the microcomputer.

The foregoing and other objects, as well as, advantages of the present invention will become apparent by following description of the present invention with reference to the accompanying drawings.

DETAILED DESCRIPTION OF THE PRESENT INVENTION

Figure 1:
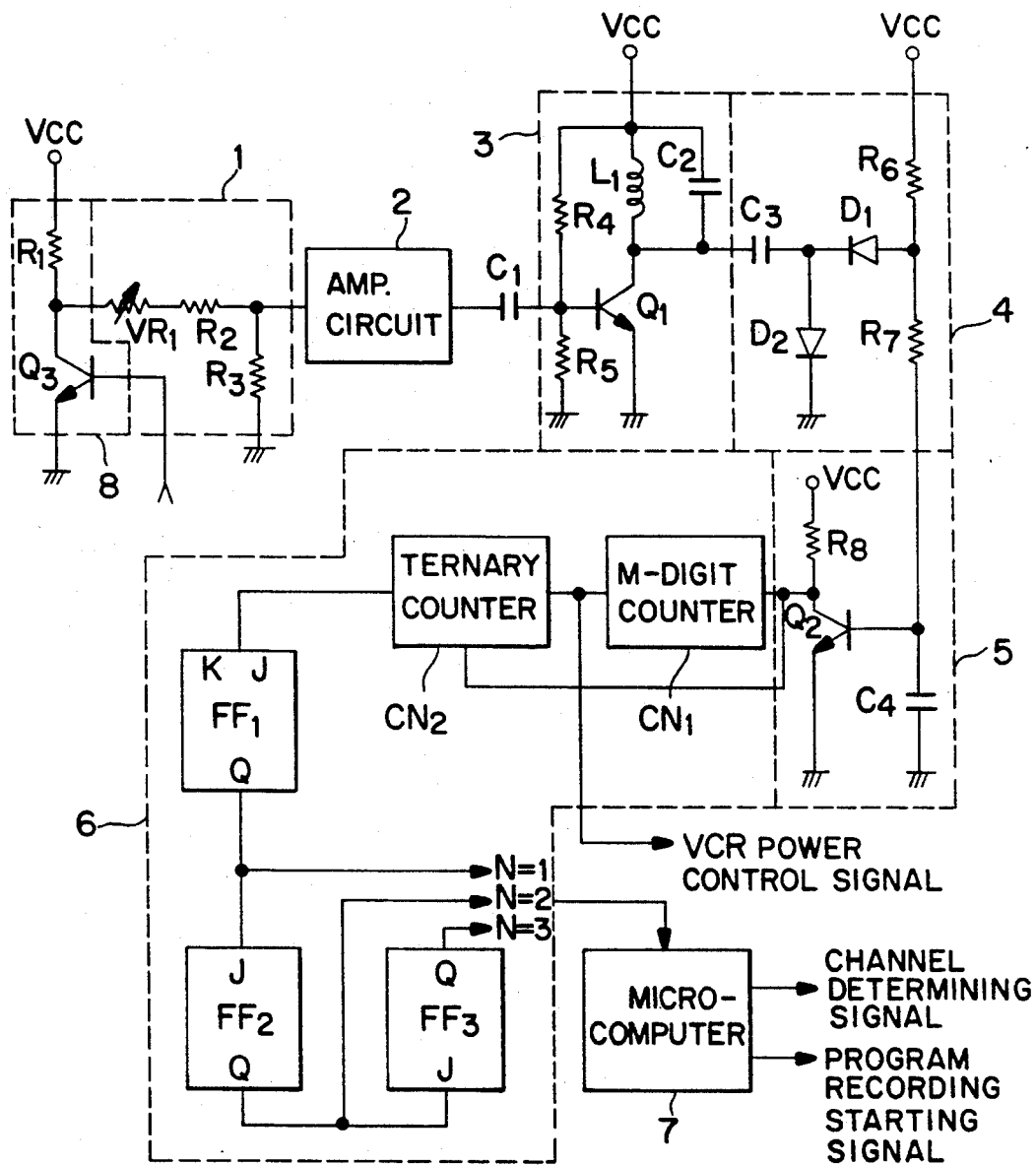
FIG. 1 is a circuit diagram of an instant program recording system according to the present invention.

FIG. 1 shows a circuit diagram of an instant program recording system according to the present invention, as shown in the drawing. The circuit comprises: a microphone 1 for receiving a telephone ringing sound, being composed in equivalent with variable resistor VR1 and resistors R2 and R3; an amplifying circuit 2 for amplifying the output signal of the microphone 1; a tuning amplifier 3 for amplifying the output signal of the amplifying circuit 2 by tuning the output signal to the frequency of telephone ringing sound, being composed of a capacitor C1 for isolating direct current, dividing resistors R4 and R5, an amplifying transistor Q1, a tuning coil L1, and a capacitor C2; a clamping circuit 4 for clamping the output signal of the tuning amplifier 3 to a negative (−) voltage, being composed of a capacitor C3 for isolating direct current, clamping diodes D1 and D2, dividing resistors R6 and R7; a switch 5 for producing pulse signal in response to the output condition of the clamping circuit 4, being composed of a filtering capacitor C4 and a switching transistor Q2; a data generator 6 for outputting a power control signal for a VCR by counting the pulse signal of the switch 5 and outputting specific channel selecting data N, being composed of a M-digit counter CN1, a ternary counter CN2, and flip-flops FF1-FF3; a microcomputer 7 for outputting the program record starting signal in response to the specific channel selecting data N of the data generator 6 and carrying out the program recording function by selecting the specific channel; and a control circuit 8 for stopping the operation of the microphone 1 in response to the program record starting signal of the microcomputer 7, being composed with a resistor R1 and a transistor Q3. In the above, flip-flops FF1-FF3 are JK flip-flops.

Figure 2A:
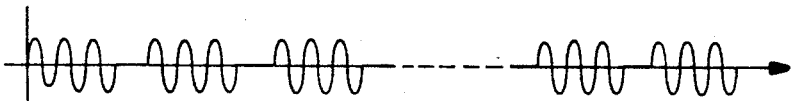
FIGS. 2A and 2B are waveform diagrams of respective portions of FIG. 1.
Figure 2B:
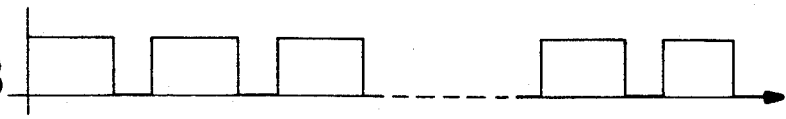

FIGS. 2A and 2B are waveform diagrams of respective portions of FIG. 1, in which FIG. 2A is a waveform diagram of telephone ringing sound (bell sound), and FIG. 2B is a waveform diagram chart of output of the switch 5.

Figure 3:
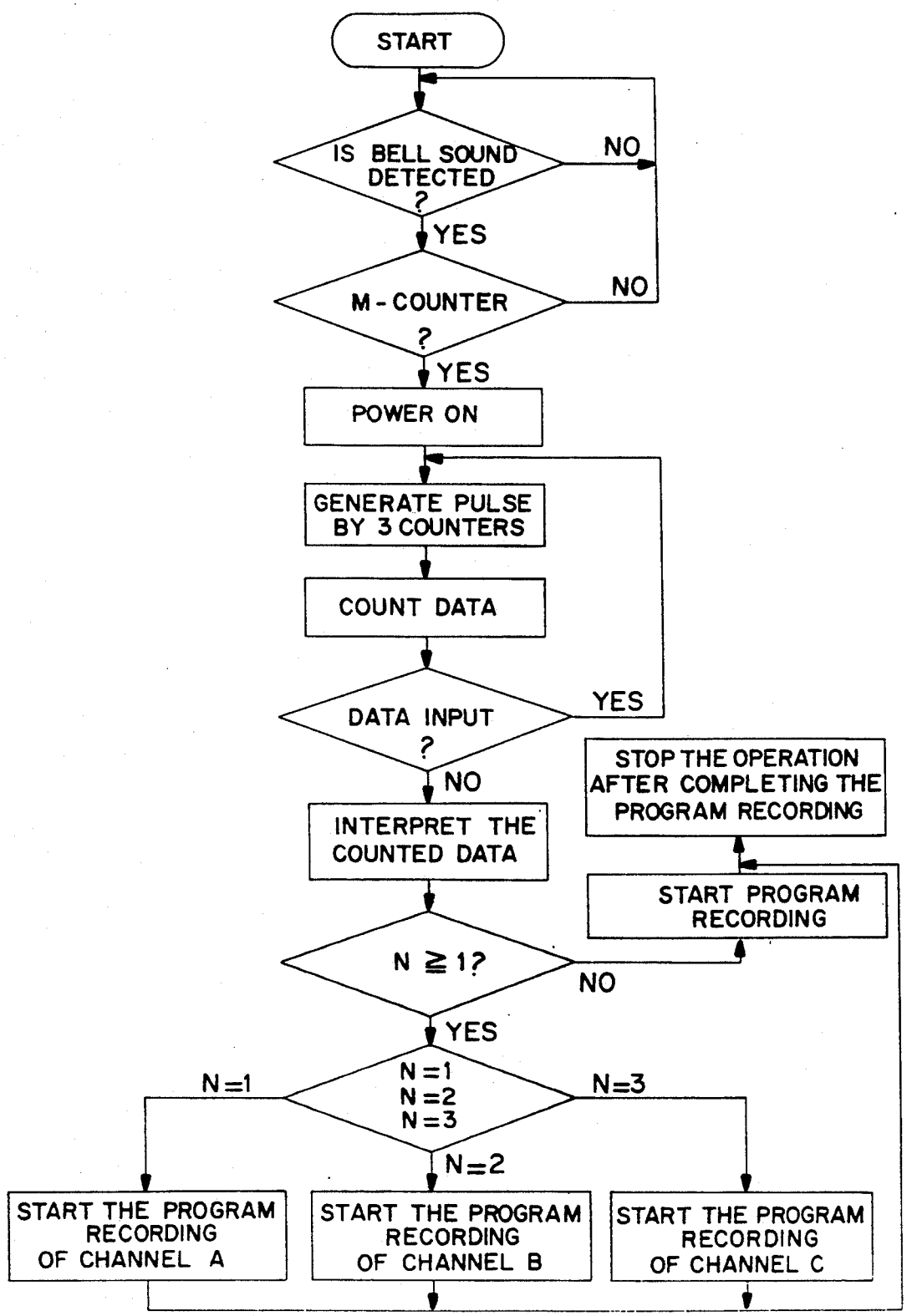
FIG. 3 is a flow chart of the program recording system of the present invention.

The operation and effect of the present invention will be described in detail with reference to the signal flow-chart of FIG. 3 as follows.

When a user calls from outside to carry out the program recording function of VCR, a telephone ring (bell sound) is produced from the telephone and being received by microphone 1, accordingly the telephone ring signal having a waveform as shown in FIG. 2A is outputted by the microphone 1. The telephone ring signal is amplified by the amplifying circuit 2 and then is applied to the base of transistor Q1 through the capacitor C1 for isolating direct current. The telephone ring signal is tuned to the telephone ring frequency by tuning coil L1 and capacitor C2 and is amplified by transistor Q1. That is, at this moment, only the telephone ring signal is amplified by the tuning amplifier 3 and is outputted. The output signal of the tuning amplifier 3 is applied to the clamping diodes D1 and D2 through a capacitor C3 of clamping means 4 for direct current isolation and is clamped in a negative (−) voltage. Accordingly, a low potential signal is applied to the base of transistor Q2 through the resistor R7 and filtering capacitor C4, turning the transistor Q2 OFF. A high potential signal, as shown in FIG. 2B, is outputted to the collector of the transistor Q2 and is applied to the M-digit counter CN1 and ternary counter CN2.

On the other hand, since the telephone dial tone signal is outputted with a predetermined time interval as shown in FIG. 2A, the diodes D1 and D2 of the clamping circuit 4 do not excute the clamping operation during the predetermined time interval when the telephone ring signal is not outputted. The power at the power supply terminal Vcc charges the filtering capacitor C4 through the resistors R6 and R7, making the transistor Q2 conductive, and therefore, the low potential signal is outputted at the said collector as shown in FIG. 2B.

Consequently, under the conditions that the telephone dial tone signal as shown in FIG. 2A is outputted, the transistor Q2 of the switch 5 alternates the ON/OFF operations and square wave with predetermined period as shown in FIG. 2B is outputted at the collector, and the square wave signal is applied to the M-digit counter CN1 and ternary counter CN2.

Therefore, the M-digit counter CN1 counts M times the number of high potential signal outputted from the switch 5 and outputs a high potential signal. This high potential signal is applied into the power control signal of VCR and the ternary counter CN2 as a driving control signal. Accordingly, the ternary counter CN2 outputs a high potential signal for every third time a high potential signal is outputted from the switch 5. The flip-flops FF1-FF3 are sequentially driven and the specific channel selecting data (N=1, N=2, N=3) are outputted. The specific channel selecting data (N=1, N=2, N=3) are applied to the microcomputer 7 so that the specific channel is selected and the program recording function is carried out.

When the specific channel selecting data N is not N≧1, the instructions for the program to be recorded by program recording and the executing of the program recording are received and processed. When the specific channel selecting data N is to N≧1, the value of the specific channel selecting data N is determined. When the specific channel data N is "1", selecting channel A is selected and the program recording function is executed. When the specific channel selecting data N is "2", channel B is selected and the program recording function is executed. When the specific channel selecting data N is "3", channel C is selected and the program recording function is executed.

Therefore, a user can make a call, and by counting the generated number of telephone rings with his own ear, the specific channel selecting data N generated from the data generator 6 is possible to be recognized. When a user makes a call and by counting the generated number of telephone required to get the specific channel selecting data N outputted at the data generator 6 and thereafter ringing up, the specific channel is automatically selected and the program recording function is carried out.

Further, since the specific channel selecting data N being to inputted the microcomputer 7 is generated by the signal counted at the ternary counter CN2 after completing the count by the M-digit counter CN1 and when anyone other than the user makes a call, the possibility of carrying out the program recording can be prevented by previously adjusting the M-digit value of the M-digit counter CN2.

On the other hand, when the program recording function is carried out by outputting the program record starting signal from the microcomputer 7 and since the program record starting signal is applied to the base of transistor Q3 of the control means 8, the transistor Q3 becomes conductive. The power supply to the microphone 1 is cut off and the operation of the microphone 1 terminated. Therefore, the wrong operation during program recording can be prevented.

As described above in detail, according to the present invention, since the specific channel is automatically selected by the telephone dial tone signal so that the program recording function can be carried out, there is an advantage that a user can call from outside, when required, and select the specific channel so that the program recording function can be carried out.

It will be appreciated that the present invention is not restricted to the particular embodiment that has been described above, and that variations and modifications may be made therein without departing from the spirit and scope of the present invention as defined in the appended claims and equivalents thereof.

What is claimed is:

1. An program recording system for a video cassette recording system utilizing a ringing sound from a telephone comprising:

microphone means for receiving the ringing sound of a telephone;

amplifying means for amplifying an output signal of said microphone means;

tuning amplifier means for amplifying an output signal of said amplifying means and for tuning said output signal of said amplifying means to a frequency of the ringing sound of the telephone;

clamping means for clamping an output signal of said tuning amplifier means to a negative voltage;

switching means for turning ON/OFF in response to an output signal of said clamping means and for outputting a square wave signal;

data generating means for outputting a power control signal for the video cassette recorder by counting a number of high potential output signals being outputted from said switching means and for outputting specific channel selecting data;

microcomputer means for outputting a program record starting signal in response to said specific channel selecting data outputted from said data generating means and for executing a program recording function by selecting a specific channel; and control means for preventing an operation of said microphone means in response to said program record starting signal of said microcomputer means.

2. The program recording system as claimed in claim 1, wherein said data generating means comprises:

M-digit counter means for outputting said power control signal by counting a predetermined number of high potential signals being outputted from said switching means;

a ternary counter for counting a number of high potential signals being outputted from said switching means when said M-digit counter means outputs a high potential signal; and flip-flop means for outputting said specific channel selecting data in response to said ternary counter.

3. A program recording system for a video recorder utilizing a ringing sound generated by a called telephone, comprising:

audio receiving means for receiving the ringing sound from the called telephone;

counting means, operatively connected to said audio receiving means, for counting a number of rings generated by the called telephone and for generating specific channel data from counting the number of rings generated by the called telephone; and controller means, operatively connected to said counting means and said audio receiving means, for initiating a recording operation in response to said specific channel data and for de-activating said audio receiving means when said recording operation is initiated.

4. The system as claimed in claim 3 wherein said audio receiving means comprises:

a microphone for picking up the ringing sound of the called telephone;

amplifying means, operatively connected to said microphone, for amplifying an output signal from said microphone; and tuning means, operatively connected to said amplifying means, for tuning an output signal from said amplifying means to a frequency of the ringing sound of the called telephone.

5. The system as claimed in claim 3 wherein said counting means comprises:

first counter means for determining when a number of rings of the called telephone exceeds a predetermined number;

second counter means, responsive to said first counter means, for counting the number of rings generated by the called telephone which exceed said predetermined number when said first counter means makes an affirmative determination; and data generating means, operatively connected to said second counter means, for generating said specific channel data in response to the count determined by said second counter means.

6. A method for programming a video recorder using a ring sound generated by a called telephone, comprising the steps of:

(a) receiving the ringing sound from the called telephone;

(b) determining a number of rings generated by a called telephone;

(c) generating specific channel data from the number determined in said step (b);

(d) performing a recording operation according to the specific channel data generated in said step (c); and (e) preventing the execution of said step (a) when said step (d) is being executed.

7. The method as claimed in claim 6 wherein said step (b) comprises the steps of:

(b1) determining if a number of rings generated by the called telephone exceeds a predetermined number; and (b2) determining a number of rings generated by the called telephone that exceeds the predetermined number when said step (b1) makes an affirmation determination;

said step (c) using the determination in said step (b2) to generate the specific channel data.

* * * * *